US012677358B2

(12) United States Patent
Archer et al.

(10) Patent No.: US 12,677,358 B2
(45) Date of Patent: Jul. 7, 2026

(54) LIGHT DRIVER WITH ADAPTIVE TRIAC DIMMING

(71) Applicant: ERP POWER, LLC, Westlake Village, CA (US)

(72) Inventors: Michael Archer, Moorpark, CA (US); James H. Mohan, Valencia, CA (US); Erik Morales, Los Angeles, CA (US); Steven C. Krattiger, Northridge, CA (US); Louis Chen, Simi Valley, CA (US)

(73) Assignee: ERP POWER, LLC, Westlake Village, CA (US)

( * ) Notice: Subject to any disclaimer, the term of this patent is extended or adjusted under 35 U.S.C. 154(b) by 52 days.

(21) Appl. No.: 18/926,225

(22) Filed: Oct. 24, 2024

(65) Prior Publication Data

US 2025/0142694 A1 May 1, 2025

Related U.S. Application Data

(60) Provisional application No. 63/593,144, filed on Oct. 25, 2023.

(51) Int. Cl.

| | |
|---|---|
| ***H05B 45/10*** | (2020.01) |
| ***H05B 45/31*** | (2020.01) |
| ***H05B 45/325*** | (2020.01) |
| ***H05B 45/59*** | (2022.01) |

(52) U.S. Cl.

CPC ............. *H05B 45/10* (2020.01); *H05B 45/31* (2020.01); *H05B 45/325* (2020.01); *H05B 45/59* (2022.01)

(58) Field of Classification Search

CPC ...... H05B 45/10; H05B 45/31; H05B 45/325; H05B 45/59; H05B 45/315; H05B 47/185

See application file for complete search history.

(56) References Cited

U.S. PATENT DOCUMENTS

| | | | | |
|---|---|---|---|---|
| 2019/0150240 | A1* | 5/2019 | Yu | H05B 45/31 315/200 R |
| 2020/0100348 | A1* | 3/2020 | Xiong | H05B 45/10 |
| 2020/0154541 | A1* | 5/2020 | Mu | H05B 45/40 |
| 2021/0153313 | A1* | 5/2021 | Li | H05B 47/165 |

* cited by examiner

*Primary Examiner* — Renan Luque

(74) *Attorney, Agent, or Firm* — Womble Bond Dickinson (US) LLP

(57) ABSTRACT

A method of driving a light source by a light driver includes determining a dimming value based on an input from a phase-cut dimmer at the input of the light driver, determining an offset for a dimmer transfer function of the light driver based on the dimming value and a minimum set point of the dimmer transfer function, applying the offset to the dimmer transfer function of the light driver to generate an adjusted dimmer transfer function, and determining a target light output of the light source based on the dimming value and the adjusted dimmer transfer function.

20 Claims, 6 Drawing Sheets

LIGHT DRIVER WITH ADAPTIVE TRIAC DIMMING

CROSS-REFERENCE TO RELATED APPLICATION(S)

This application claims priority to and the benefit of U.S. Provisional Patent Application No. 63/593,144, filed in the United States Patent and Trademark Office on Oct. 25, 2023, the entire disclosure of which is incorporated by reference herein.

FIELD

Aspects of the present disclosure are related to light emitting diode (LED) drivers.

BACKGROUND

A light emitting diode (LED) is an electronic device that converts electrical energy (commonly in the form of electrical current) into light. The light intensity of an LED is primarily based on the magnitude of the driving current. Given that an LED luminosity is very sensitive to drive current changes, in order to obtain a stable luminous output without flicker, it is desirable to drive LEDs by a constant-current source.

Generally, lighting sources are powered by an input AC voltage of 110 or 220 VAC at 50 or 60 Hz line frequency. Generally, a light driver (e.g., an LED driver) rectifies the input AC voltage via a rectifier and converts it to a desired output current level that will be utilized by the LED. Today, many light drivers are connected at the input to a phase-cut dimmer (e.g., a TRIAC dimmer) that is used to dim the light produced by the light driver. However, given the variety in phase-cut dimmers that may be in use, a light driver may have no way of knowing what angle a particular out-of-the-box phase-cut dimmer will be set to or what angle a user/customer may set it to. For example, dimmers with adjustable Low End Trim settings can be set anywhere between about 25° to 60° or more conduction angle while other legacy dimmers may not have low end trim adjustments available. Many of these legacy dimmers will default to a low conduction angle once the slider is set to its lowest position.

To improve compatibility with a variety of different phase-cut dimmers, a light driver may have a minimum set point value above which the driver begins to conduct meaningful current that is higher than the minimum conduction angle of most phase-cut dimmers. For example, the minimum set point may be set to about 45° conduction angle. However, this can lead to large dead zones before the conduction angle of the phase-cut dimmer crosses the minimum set point value to begin dimming up. This dead zone may be clearly visible on startup with light drivers that have a fixed slew rate and slowly increase the conduction angle from the a low level up to the desired startup conduction angle.

The above information disclosed in this Background section is only for enhancement of understanding of the invention, and therefore it may contain information that does not form the prior art that is already known to a person of ordinary skill in the art.

SUMMARY

Aspects of embodiments of the present disclosure are directed to a light driver utilizing an output correction circuit that is capable of adjusting its dimmer transfer function to reduce (e.g., minimize) the length of the dead zone that is perceivable by a user.

According to some embodiments of the present disclosure, there is provided a method of driving a light source by a light driver, the method including: determining a dimming value based on an input from a phase-cut dimmer at the input of the light driver; determining an offset for a dimmer transfer function of the light driver based on the dimming value and a minimum set point of the dimmer transfer function; applying the offset to the dimmer transfer function of the light driver to generate an adjusted dimmer transfer function; and determining a target light output of the light source based on the dimming value and the adjusted dimmer transfer function.

In some embodiments, the method further includes driving the light source to the target light output.

In some embodiments, the determining the dimming value includes: receiving a pulse-width modulation (PWM) signal having a duty cycle corresponding to a conduction angle of the phase-cut dimmer; and generating the dimming value based on the duty cycle of the PWM signal.

In some embodiments, the dimmer transfer function maps dimming values to target light outputs.

In some embodiments, the minimum set point corresponds to a dimming level above which the light driver begins to increase light output from a lowest target output.

In some embodiments, the lowest target output is about 1% light output.

In some embodiments, the determining the offset of the dimmer transfer function includes: determining that the dimming value is less than a minimum threshold of the dimmer transfer function of the light driver; and determining the offset as a maximum offset.

In some embodiments, the determining the offset of the dimmer transfer function includes: determining the dimming value is greater than or equal to a minimum threshold of the dimmer transfer function of the light driver; and determining the offset based on the dimming value, the minimum set point, and a deadband value.

In some embodiments, the determining the offset includes: determining that the dimming value is greater than a difference between the minimum set point and the deadband value; and setting the offset to zero.

In some embodiments, the determining the offset includes: determining that the dimming value is less than a difference between the minimum set point and the deadband value; and calculating the offset by subtracting the dimming value from the difference between the minimum set point and the deadband value.

In some embodiments, the applying the offset to the dimmer transfer function of the light driver includes: subtracting the offset from the minimum set point of the dimmer transfer function to generate the adjusted dimmer transfer function.

In some embodiments, the applying the offset to the dimmer transfer function of the light driver includes: subtracting the offset from the minimum set point and a maximum set point of the dimmer transfer function to generate the adjusted dimmer transfer function.

In some embodiments, the maximum set point corresponds to a dimming level above which the light driver does not increase light output from a highest target output. In some embodiments, the highest target output is about 100% light output.

In some embodiments, the determining the target light output of the light source includes: interpolating between data points of the adjusted dimmer transfer function to determine the target light output based on the dimming value.

According to some embodiments of the present disclosure, there is provided a light driver including: a processor; and a memory storing instructions that, when executed on the processor, cause the processor to perform: determining a dimming value based on an input from a phase-cut dimmer at the input of the light driver; determining an offset for a dimmer transfer function of the light driver based on the dimming value and a minimum set point of the dimmer transfer function; applying the offset to the dimmer transfer function of the light driver to generate an adjusted dimmer transfer function; and determining a target light output of a light source coupled to the light driver based on the dimming value and the adjusted dimmer transfer function.

In some embodiments, the light driver further includes: a rectifier configured to receive a phase-cut input line voltage from a phase-cut dimmer at an input of the rectifier and configured to generate a rectified input line voltage; and a pulse-width modulation (PWM) generator configured to generate a PWM signal based on the rectified input line voltage, the PWM signal having a duty cycle corresponding to a conduction angle of the phase-cut dimmer, wherein the determining the dimming value is based on the PWM signal.

In some embodiments, the light driver further includes: a converter configured to convert the rectified input line voltage into a drive signal for powering the light source coupled to the light driver, wherein the drive signal is based on the target light output.

In some embodiments, the determining the offset of the dimmer transfer function includes: determining the dimming value is greater than or equal to a minimum threshold of the dimmer transfer function of the light driver; and determining the offset based on the dimming value, the minimum set point, and a deadband value.

In some embodiments, the applying the offset to the dimmer transfer function of the light driver includes: adding the offset to the minimum set point of the dimmer transfer function to generate the adjusted dimmer transfer function.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of a light driver (e.g., an LED driver) with an output correction circuit and driver control system, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Many light drivers connect to a phase-cut dimmer, such as a TRIAC dimmer, to dim the light produced. The variety in phase-cut dimmers presents challenges, as a light driver may not know the angle at which a particular dimmer will be set. Dimmers with adjustable low end trim settings can range from about 25° to about 60° or more conduction angle, while legacy dimmers may lack such adjustments, defaulting to a low conduction angle at the minimum slider position. To enhance compatibility, a light driver may have a minimum set point value above which the light driver begins to conduct meaningful current, which is higher than the minimum conduction angle of most dimmers. However, this can lead to large dead zones before the dimmer's conduction angle crosses the minimum set point value, resulting in visible dead zones on startup with light drivers that have a fixed slew rate.

Aspects of the present disclosure are directed to a light driver utilizing an output correction circuit capable of adjusting the dimmer transfer function (e.g., adjusting the minimum set point of the dimmer transfer function) to reduce the length of the visible dead zone. This light driver dynamically adapts to various dimmer settings, ensuring a smoother transition and minimizing the dead zone effect.

Figure 1A:
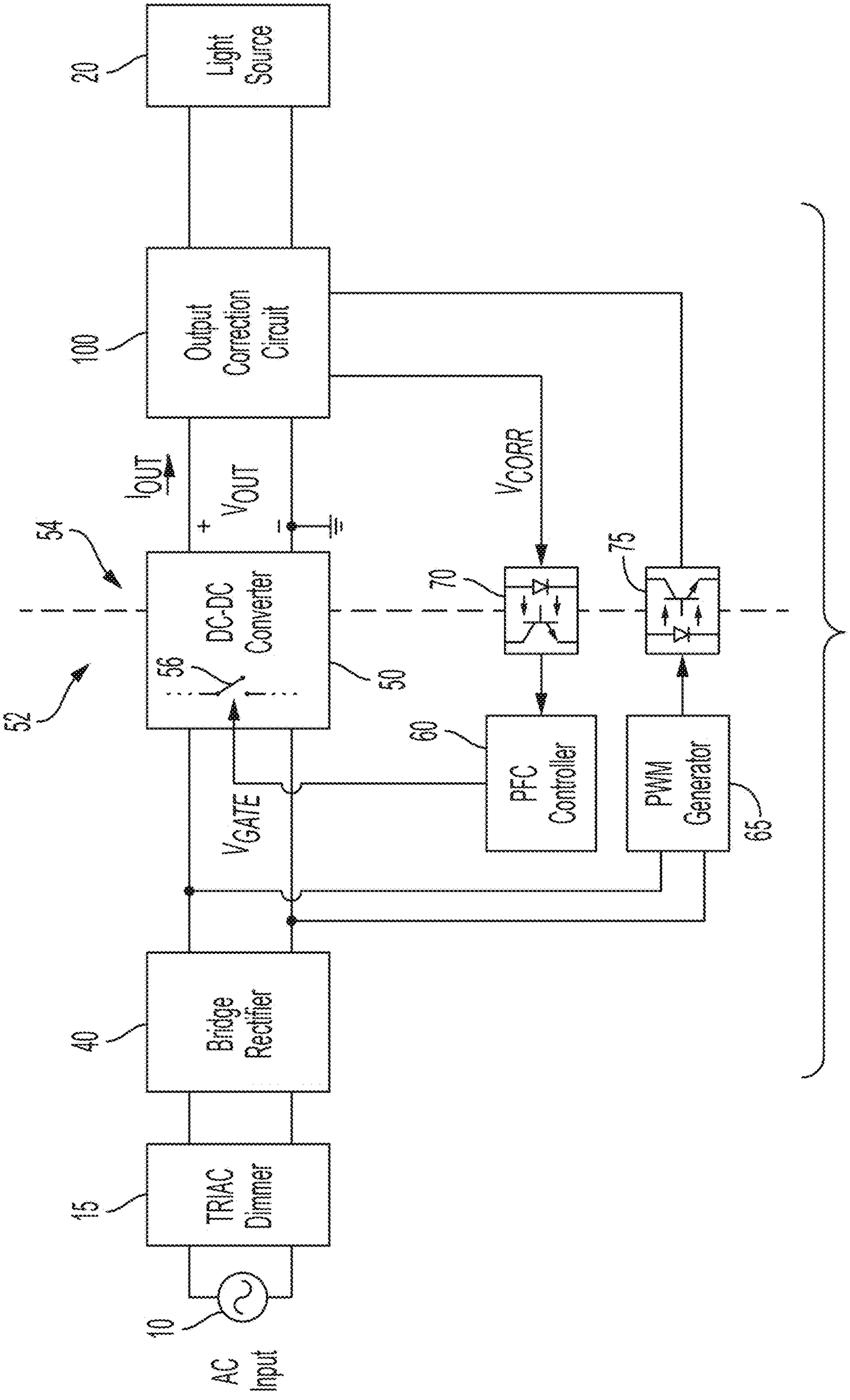
FIG. 1A illustrates a lighting system including a light driver having an output correction circuit, according to some example embodiments of the present disclosure.

FIG. 1A illustrates a lighting system 1 including a light driver 30 having an output correction circuit 100, according to some example embodiments of the present disclosure.

According to some embodiments, the lighting system 1 includes an input source 10, a light source 20, and a light driver 30 (e.g., a switched-mode power supply) for powering and controlling the brightness of the light source 20 based on the signal from the input source 10.

The input source 10 may include an alternating current (AC) power source that may operate at a voltage of 100 Vac, 120 Vac, 240 Vac, or 277 Vac, for example. The input source 10 may be coupled to (e.g., feed into) a dimmer (e.g., a phase-cut dimmer) 15 electrically powered by said AC power source 10. The dimmer 15 may modify (e.g., cut/chop a portion of) the input AC signal according to a dimmer level before sending it to the light driver 30, and thus variably reduces the electrical power delivered to the light driver 30 and the light source 20. According to some examples, the dimmer 15 may be a TRIAC or ELV dimmer, and may chop the front end or leading edge of the AC input signal. In some examples, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like. The light source 20 may include one or more light-emitting-diodes (LEDs) or any other solid-state lighting device, or an arc or gas discharge lamp with electronic ballasts, such as high intensity discharge (HID) or fluorescent lights.

In some embodiments, the light driver 30 includes a rectifier 40, a converter 50, and an output correction circuit (e.g., a secondary-side output correction circuit) 100.

The rectifier 40 may provide a same polarity of output for either polarity of the AC signal from the input source 10. In some examples, the rectifier 40 may be a full-wave circuit using a center-tapped transformer, a full-wave bridge circuit with four diodes, a half-wave bridge circuit, a multi-phase rectifier, or the like.

The converter (e.g., the DC-DC converter) 50 converts the rectified AC signal generated by the rectifier 40 into a drive signal for powering and controlling the brightness of the light source 20. The drive signal may depend on the type of the one or more LEDs of the light source 20. For example, when the one or more LEDs of the light source 20 are constant current LEDs the drive signal may be a variable voltage signal, and when the light source 20 requires constant voltage, the drive signal may be a variable current signal. In some embodiments, the converter 50 includes a boost converter for maintaining (or attempting to maintain) a constant or substantially constant DC bus voltage on its output while drawing a current that is in phase with and at the same frequency as the line voltage (by virtue of the power factor correction (PFC) controller 60). Another switched-mode converter (e.g., a transformer) inside the converter 50 produces the desired output voltage from the DC bus. The converter has a primary side 52 and a secondary side 54 that is electrically isolated from, and inductively coupled to, the primary side 52. In some examples, the PFC controller 60 may be configured to improve (e.g., increase) the power factor of the load on the input source 10 and reduce the total harmonic distortions (THD) of the light driver 30. The PFC controller 60 may be external to the converter 50, as shown in FIG. 1, or may be internal to the converter 50.

Figure 1B:
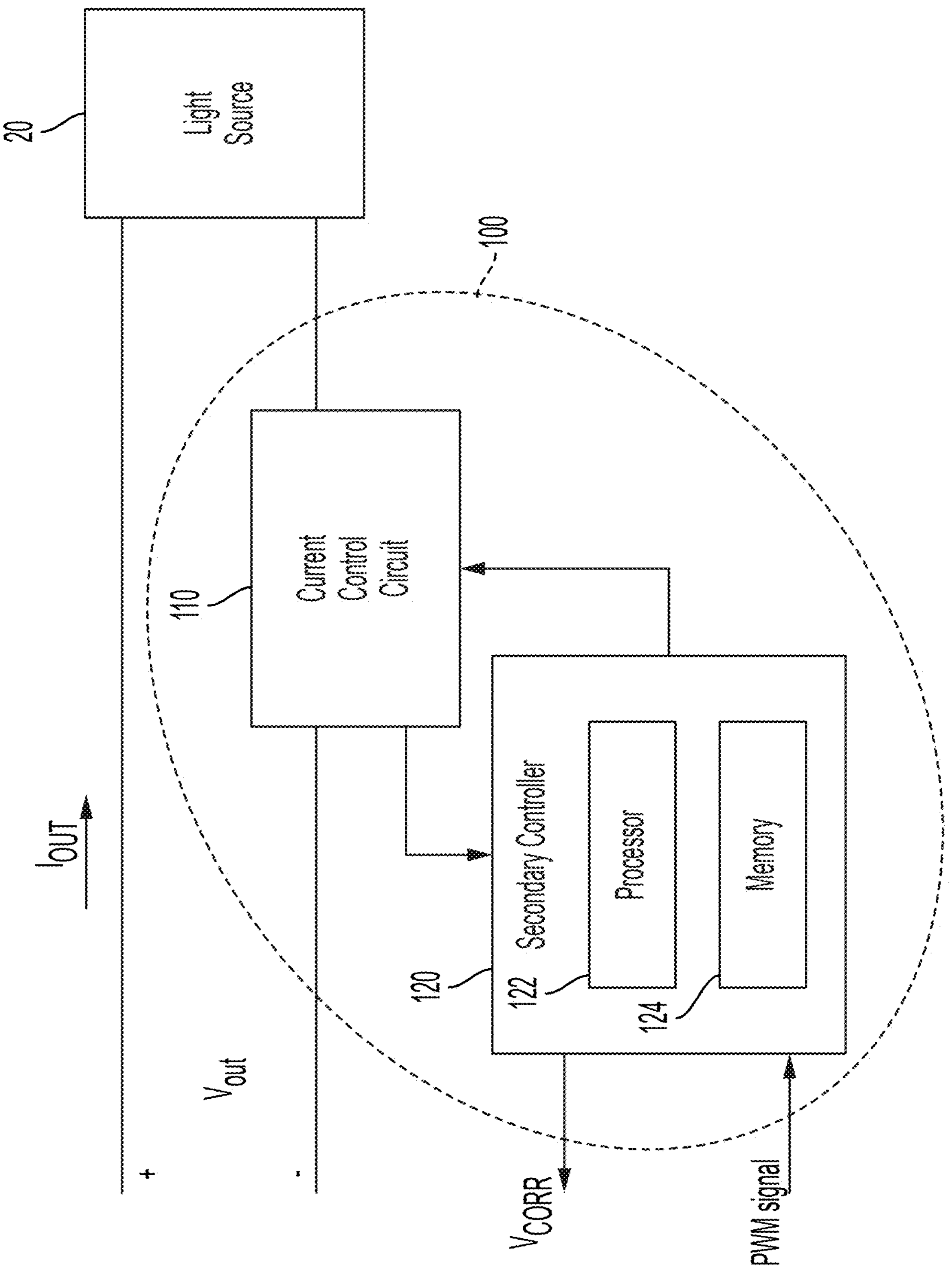
FIG. 1B illustrates the output correction circuit of the light driver, according to some example embodiments of the present disclosure.

FIG. 1B illustrates the output correction circuit 100 of the light driver, according to some example embodiments of the present disclosure.

According to some embodiments, the output correction circuit 100 includes a current control circuit 110 and a controller (e.g., a channel controller) 120. The current control circuit 110 may be electrically coupled to the secondary side 54 of the converter 50 and is electrically isolated from the primary side 52. The current control circuit 110 facilitates the regulation of the current $I_{OUT}$ that is output to the light source 20. The current control circuit 110 may measure the output current $I_{OUT}$ and/or the output voltage $V_{OUT}$ and transmit this information to the controller 120 for processing. The controller 120 determines the target output intensity of light source 20 and generates a reference signal for transmission to the output correction circuit 100 based at least in part on the output current $I_{OUT}$ and/or the output voltage $V_{OUT}$ provided by the current control circuit 110.

In some examples, the current control circuit 110 may adjust the output current $I_{OUT}$ by using a voltage-controlled resistor (VCR) or a linear pass element, or may regulate the current using a regulator. However, embodiments of the present disclosure are not limited thereto, and any suitable means of current control may be used.

For the sake of simplicity, FIG. 1B illustrates an example of a lighting system having a single color channel. However, embodiments of the present disclosure are not limited thereto. For example, the lighting system may have a plurality of color channels such as a green color channel, a blue color channel, and a red color channel. In such examples, each channel may have a corresponding current control circuit 110 that is independently controlled by the controller 120.

In some embodiments, the controller 120 includes a processor (or processing circuit) 122 that serves as the central processing unit of the controller 120 and manages data flow and executes control algorithms for the channel controller 102. The controller 120 further includes a memory 124 that provides storage for data and system configurations that are required for system operation.

As used herein, the terms "processor" and "processing circuit" include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example, a processing circuit may include two processing circuits, an FPGA and a CPU, interconnected on a PWB.

According to some embodiments, the output correction circuit 100 ensures that the DC level of the output signal accurately represents the desired dimmer setting. In some embodiments, the output correction circuit 100 measures the output current (e.g., instantaneous output current) $I_{OUT}$ of the converter 50, averages the measured output current over a period of time, and adjusts (e.g., increases or decreases) a reference signal that corresponds to the desired output based on the average output current $I_{OUT}$. The difference (i.e., error) between the adjusted reference signal and the measured output current $I_{OUT}$ is used to generate the correction signal $V_{CORR}$ (also referred to herein as the control signal). In some embodiments, the correction signal is used to dynamically control a DC-level of the output signal of the converter 50.

In some examples, an optocoupler 70 communicates the control/correction signal $V_{CORR}$ from the output correction circuit 100 on the secondary side 54 to the primary side 52, while maintaining the electrical isolation between the two sides.

According to some embodiments, the primary side 52 of the light driver 30 includes a PWM generator 65 is configured to convert the modified AC input signal received from the bridge rectifier 40 into a pulse width modulation (PWM) signal for processing by the output correction circuit 100. The PWM generator 65 may include one or more comparators that compare the positive and negative swings of the incoming modified AC input signal with one or more set or predefined thresholds to generate a corresponding PWM signal. Thus, the PWM generator 65 maps the dimmed power of the modified AC input signal to pulse width modulations of the PWM signal. In some examples, the duty cycle of the PWM signal represents the dimmer level (i.e., the user setting at the dimmer 15). In some examples, a high value in the PWM signal may be about 3.3 V, which may correspond to a logic high (or a binary '1'), and a low value may be about 0 V, which may correspond to a logic low (or binary '0).

In some examples, the optocoupler 75 transmits the PWM signal across the primary-secondary barrier to the output correction circuit 100, while maintaining electrical isolation between the primary and secondary sides 52 and 54.

In some embodiments, the output correction circuit 100 is configured to measure (e.g., continuously measure) the duty cycle of the PWM signal and to generate a sequence of sample values (also referred to herein as dimming values), which may correspond to the dimming levels of the dimmer 15 at a plurality of sample times. Each sample value corresponds to a new target setting that the light source 20 should output. The sampling frequency of the output correction circuit 100 may be significantly faster than the speed at which a user can change the dimmer level. For example, the sampling frequency may be about 12 kHz or higher.

The output correction circuit 100 detects changes in the dimmer level based on the sequence of samples, and processes (e.g., dynamically filters and averages) the sampled dimming values to reduce or eliminate noise in the analog dimmer signal from the dimmer 15 that could otherwise cause flickering when driving the light source 20.

According to some embodiments, the light driver 30 (e.g., the output correction circuit 100) determines the target output of the light source 20 from the dimmer level based on a dimmer transfer function.

Figure 2:
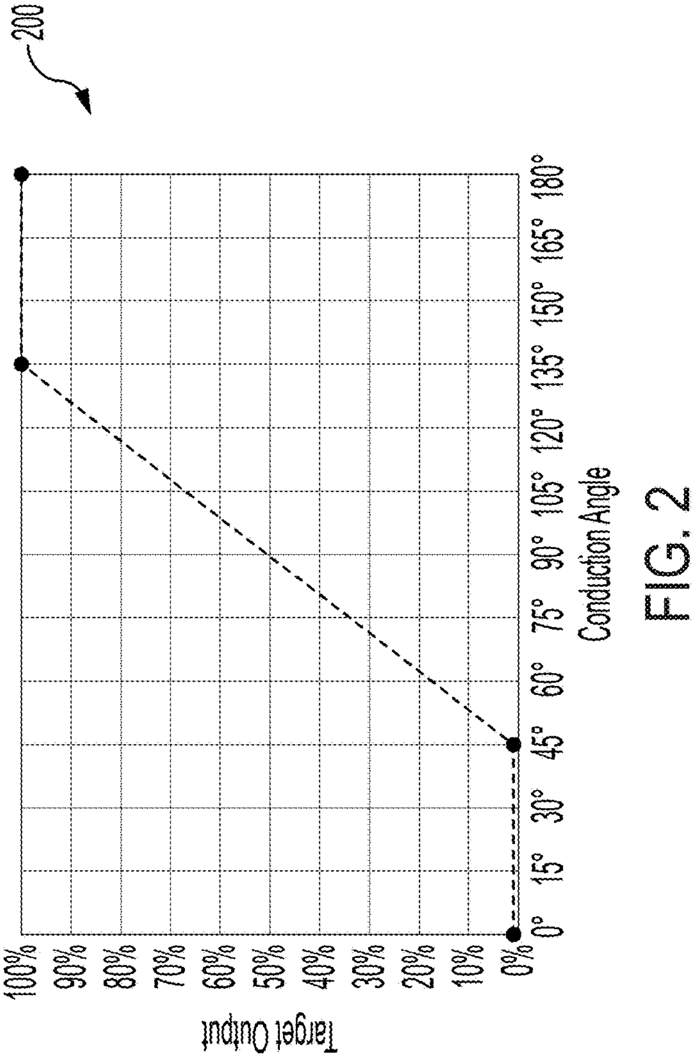
FIG. 2 is a graph illustrating a dimmer transfer function utilized by the light driver, according to some embodiments of the present disclosure.

FIG. 2 is a graph 200 illustrating a dimmer transfer function utilized by the light driver 30, according to some embodiments of the present disclosure.

The dimmer transfer function depicted in FIG. 2 provides an example of the relationship between the conduction angle of a phase-cut dimmer as perceived by the output correction circuit 100 via the PWM signal and the target output of a light driver expressed as a target percentage of the maximum output current/light intensity. In other words, the dimmer transfer function is used to translate the duty cycle of the received PWM signal to an output target current that the light driver 30 will drive to. The graph is a visual representation of how the target output increases as the conduction angle rises, starting from a minimum set point of about 45° conduction angle and reaching a maximum output at around 135° conduction angle. The memory 124 of the output correction circuit 100 may store the dimmer transfer function in the firm of a look-up table or a formula. The dimmer transfer function of example of FIG. 2 may be represented by the lookup table below:

| Conduction Angle | Target Output |
|---|---|
| 0° | 1% |
| 45° | 1% |
| 135° | 100% |
| 180° | 100% |

The dimmer transfer function may have a minimum set point (minSetPoint) that defines the conduction angle at which the light intensity/output current drops to a minimum dimming value (e.g., 1% current/light output). The dimmer transfer function may also have a maximum set point (maxSetPoint) that defines the conduction angle (or dimming level) above which the light driver does not increase light output from a highest target output (e.g., 100% current/light output). In the example of FIG. 2, the minimum set point (minSetPoint) is about 45° and the maximum set point (maxSetPoint) is about 135°. In some embodiments, when a dimming value/conduction angle falls between data points of look-up table/dimmer transfer function, the output correction circuit 100 interpolates between data points of the dimmer transfer function to determine the target light output based on the dimming value.

According to some embodiments, the light driver 30 monitors the dimming level (via the PWM signal) and adjusts the dimmer transfer function (e.g., at least the minimum set point of the transfer function) when a new minimum dimming level is detected. In some examples, the adjustment may be done by subtracting a calculated offset from one or more points of the dimmer transfer function. This will be described in further detail with respect to FIGS. 3, 4A, and 4B.

Figure 3:
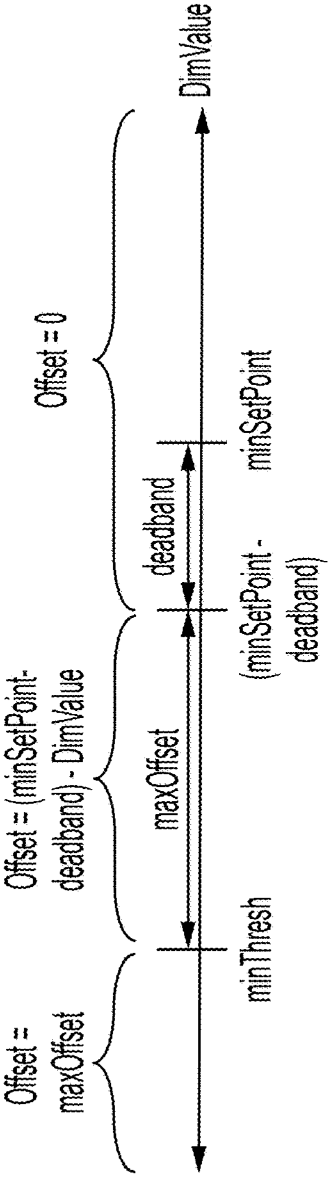
FIG. 3 is a diagram illustrating the process of adjusting the dimmer transfer function of the light driver, according to some embodiments of the present disclosure.

FIG. 3 is a diagram illustrating the process of adjusting the dimmer transfer function of the light driver 30, according to some embodiments of the present disclosure.

According to some embodiments, the dimmer transfer function (e.g. the minimum set point of the dimmer transfer function) can be changed based on the relation between a calculated dimming value (DimValue) and the values minimum threshold (minThreshold), minimum set point (minSetPoint), and deadband. Here, the dimming value is the filtered/averaged dimming level that is proportional to the phase-cut conduction angle. The minimum threshold is the minimum conduction angle that the light driver 30 can successfully operate at, which may be experimentally found. When the dimming level/conduction angle is lower than the minimum threshold (min Threshold), the light driver 30 does not receive sufficient RMS power at its input to appropriately bias its internal circuits and achieve a stable light output. The minimum set point is the current conduction angle/dimming level above which above which the light driver 30 begins to increase light output from a lowest target output (e.g., 1% light output). Other parameters utilized by the light driver 30 to determine how much to adjust the dimmer transfer function include deadband, which may be experimentally determined, and maximum offset (maxOffset), which may be defined by Equation 1:

$$\max Offset = (\min SetPoint - deadband) - \min Thresh \quad \text{Eq. (1)}$$

The table below illustrates the values of some of these parameters according to some examples.

| | Conduction Angle | Duty Cycle (0-10,000) | Conduction Time |
|---|---|---|---|
| deadband | 4.5° | 250 | 0.208 ms |
| minThresh | 27.0° | 1500 | 1.250 ms |
| maxOffset | 13.5° | 750 | 0.625 ms |

In some embodiments, when the dimming value is greater than or equal to the current minimum set point (minus a small deadband), the dimmer transfer function is not adjusted (i.e., will stay the same; offset=0). When the dimming value is below the current minimum set point (minus a small deadband), the output correction circuit 100 calculates an offset as expressed by Equation 2:

$$\text{offset} = (\min SetPoint - deadband) - DimValue \quad \text{Eq. (2)}$$

This value reaches maximum offset (maxOffset) once the dimming value (DimValue) drops to the level of minimum threshold (minThreshold). Because the minimum threshold (minThreshold) represents the lowest dimming level at which the light driver 30 can operate, when the dimming value (DimValue) drops below the minimum threshold (minThreshold), the light driver 30 caps the offset at maximum offset (maxOffset) to ensure proper operation of the light driver 30.

The use of the deadband value (which may, e.g., be the equavalnet of about 2.5 degree of conduction angle) in the above calculations serves to ensure that there will be a small dead zone where the conduction angle reaches 1% output current and remains at 1%. This may account for noisy conduction angle readings or any minor bounce in the conduction angle.

According to some embodiments, the output correction circuit 100 utilizes the offset value to adjust the dimmer transfer function. In some embodiments, the output correction circuit 100 adjusts/offsets only the minimum set point (minSetPoint) of the transfer and not the maximum set point (maxSetPoint) of the dimmer transfer function, the dimming slew rate of the dimmer transfer function may change. However, embodiments of the present disclosure are not limited thereto, and in some examples, the entire dimmer transfer function may be shifted/offset by the finally calculated offset value. That is, in some examples, both of the minSetPoint and the maxSetPoint of the dimmer transfer function may be shifted/offset by the same offset amount.

Figure 4A:
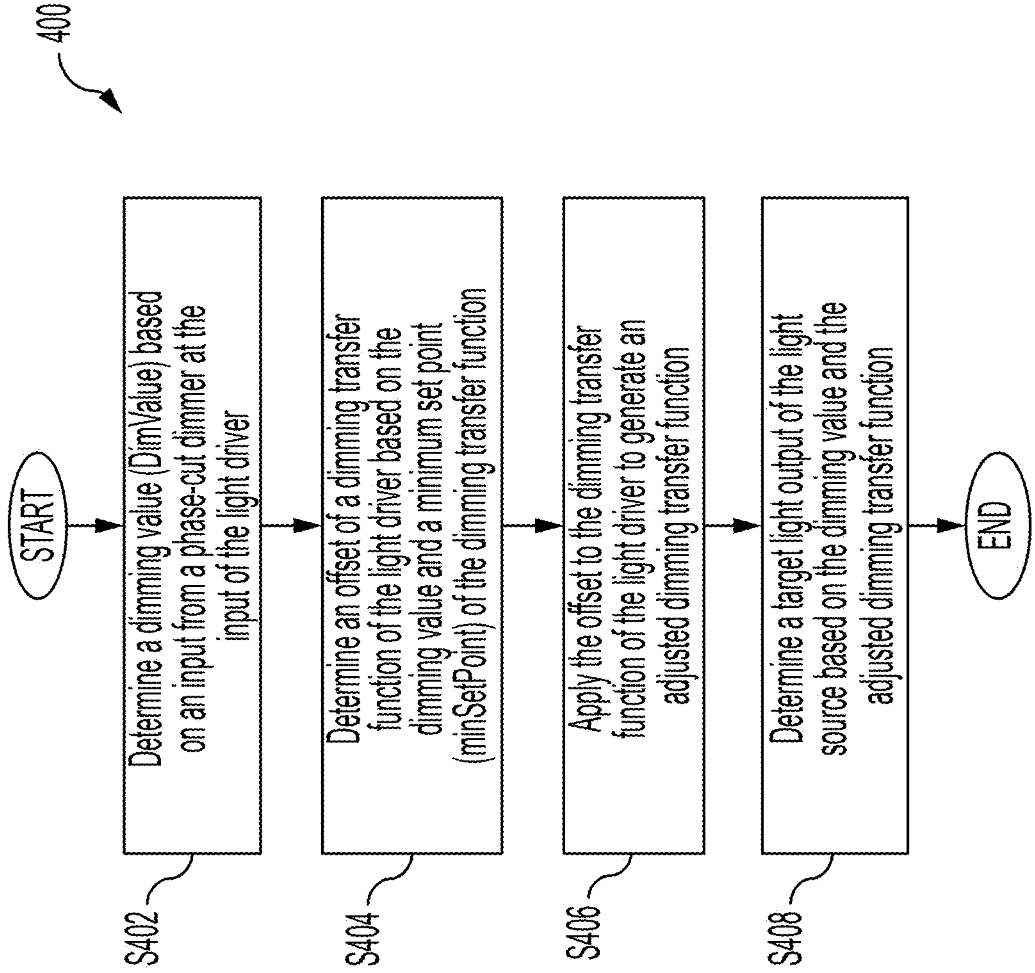
FIG. 4A is a flow diagram illustrating the process of driving the light source by the light driver, according to some embodiments of the present disclosure.

FIG. 4A is a flow diagram illustrating the process 400 of driving the light source 20 by the light driver 30, according to some embodiments of the present disclosure.

According to some embodiments, the light driver 30 (e.g., the output correction circuit 100) determines a dimming value (DimValue) based on an input from a phase-cut dimmer 15 at the input of the light driver 30 (S402). In so doing, the output correction circuit 100 receives a pulse-width modulation (PWM) signal from the PWM generator 65 that has a duty cycle corresponding to the conduction angle of the phase-cut dimmer 15, and generates the dimming value based on the duty cycle of the PWM signal.

In some embodiments, the light driver 30 (e.g., the output correction circuit 100) determines an offset for a dimmer transfer function of the light driver 30 based on the dimming value (DimValue) and a minimum set point (minSetPoint) of the dimmer transfer function (S404).

The light driver 30 (e.g., the output correction circuit 100) then applies the offset to the dimmer transfer function, which maps dimming values to target current/light outputs, of the light driver to generate an adjusted dimmer transfer function (S406). In some embodiments, the application of the offset is done by subtracting the offset from the minimum set point (minSetPoint) of the dimmer transfer function to generate the adjusted dimmer transfer function. In some examples, the light driver 30 may shift the entire dimmer transfer function by the offset value (e.g., by subtracting the offset from the minimum set point and the maximum set point), which shifts the dimmer transfer function shown in FIG. 2 to the left.

The light driver 30 (e.g., the output correction circuit 100) then determines a target light output of the light source 20 based on the dimming value and the adjusted dimmer transfer function. The light driver 30 drives the light source 20 to the target light output (e.g., via the control/correction signal $V_{CORR}$ to the PFC controller 60).

Figure 4B:
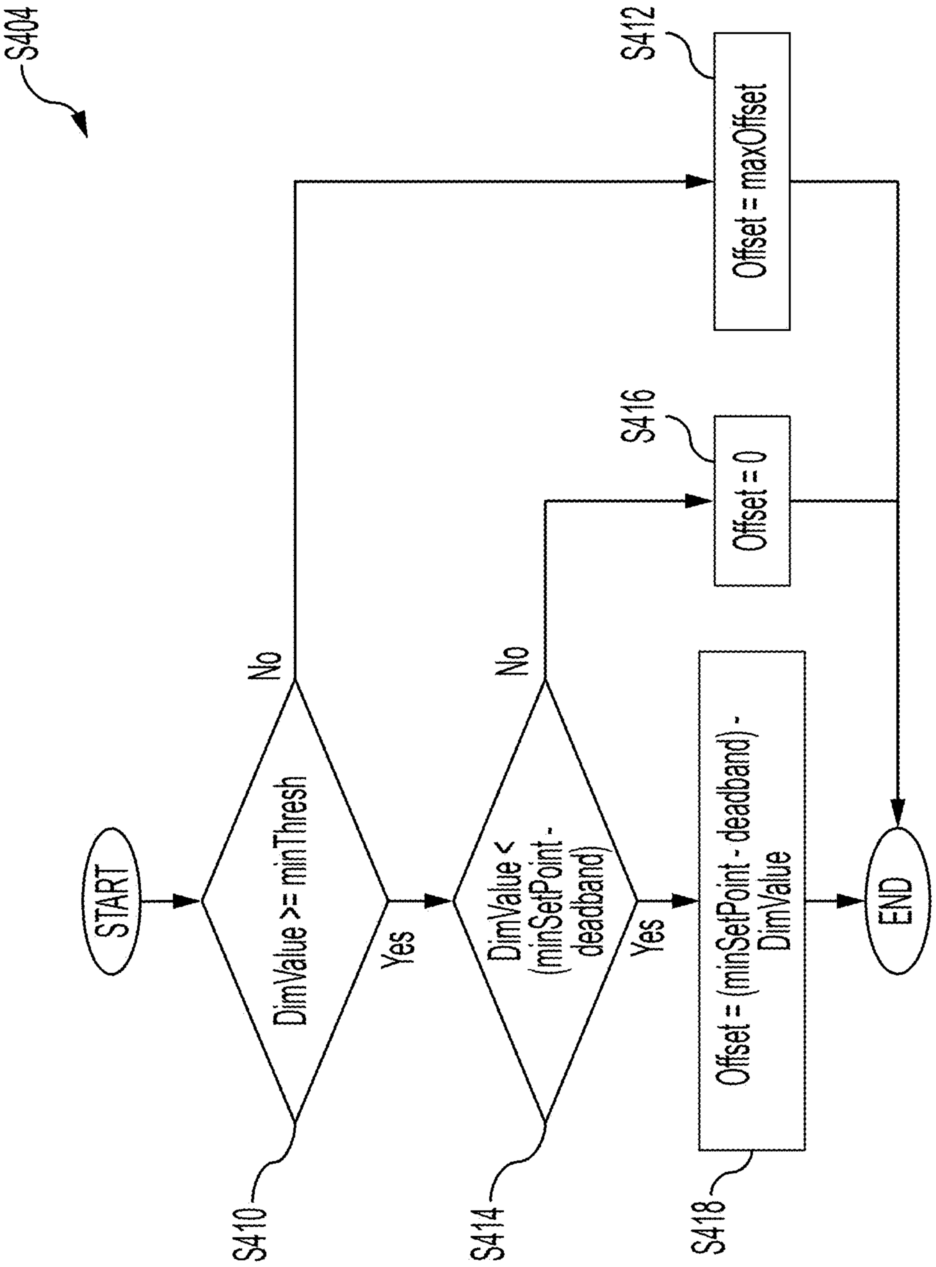
FIG. 4B is a flow diagram illustrating the process of determining the offset for adjusting the dimmer transfer function, according to some embodiments of the present disclosure.

FIG. 4B is a flow diagram illustrating the process 404 of determining the offset for adjusting the dimmer transfer function, according to some embodiments of the present disclosure.

According to some embodiments, the light driver 30 (e.g., the output correction circuit 100) determines whether the dimming value (DimValue) is greater than or equal to the minThresh (S410). If not (i.e., if DimValue is less than the minThresh), the light driver 30 sets the offset to its maximum value of maxOffset (e.g., 750, in a scale of 0 to 10,000; S412). Otherwise, the light driver 30 proceeds to compare the calculated dimming value (DimValue) with the value minimum set point (minSetPoint) minus the deadband value (S414). When the dimming value (DimValue) is greater than or equal to the minimum set point (minSetPoint) minus the deadband value, the light driver 30 sets the offset to zero (i.e., does not adjust the dimmer transfer function; S416). However, when the dimming value (DimValue) is less than the minimum set point (minSetPoint) minus the deadband value, the light driver 30 calculates the offset using Equation 2, that is (S418)

$$\text{Offset} = (\min SetPoint - deadband) - DimValue$$

In some examples, the process 404 is designed to only adjust downward. This is to ensure that the light driver 30 does not accidently set the driver to 1% when the dimmer is higher than the original minimum set point (e.g., corresponding to a conduction angle of about) 45°.

In some embodiments, once the offset is calculated, the light driver 30 saves the offset value and the newly calculated adjusted dimmer transfer function (e.g, the offset minSetPoint) to memory and continuously monitors the dimming value (DimValue). The process 400 may be retriggered when the dimming value (DimValue) is less than previously stored minimum set point (minSetPoint) by a certain amount (i.e., the deadband). This may be done to ensure that the process does not get triggered too frequently and prevents unwanted retriggering of the process (e.g., in the case of undershooting of the conduction angle while dimming or if the conduction angle is bouncing up/down due to noise). In some examples, a user may also be able to externally trigger the process 400 via a user GUI displayed on a device in wireless communication with the light driver 30.

The table below illustrates examples of different dimming values and the corresponding offsets that are calculated by the light driver 30:

| | Dimming Value | | | | | |
|---|---|---|---|---|---|---|
| | 45.0° | 40.0° | 35.0° | 30.0° | 27.0° | 20.0° |
| % Duty | 2500 | 2222 | 1944 | 1667 | 1500 | 1111 |
| Conduction Time | 2.08 ms | 1.85 ms | 1.62 ms | 1.39 ms | 1.25 ms | 0.93 ms |
| Offset in % Duty | 0 | 28 | 306 | 583 | 750 | 750 |
| Offset in conduction angle degrees | 0.0° | 0.5° | 5.5° | 10.5° | 13.5° | 13.5° |

For example, when the dimming Value is at 35°, the calculated offset is 5.5° (for a deadband value of 4.5%). The offset is subtracted from the minimum set point (minSet- Point) of the dimmer transfer function is adjusted down to 39.5° from 45°. The corresponding lookup table of the dimmer transfer function then becomes:

| Dimmer Value | Target Output |
|---|---|
| 0.0° | 1% |
| 39.5° | 1% |
| 135.0° | 100% |
| 180.0° | 100% |

From this point on, subsequent startups of the light driver 30 where the conduction angle of the phase-cut dimmer 15 is above 39.5° have less of a plateau than before. If a startup attempt was conducted using the old transfer function points, the length of the dead zone would be proportional to how long the dimmer takes to slew from 35° to 45°. After the change, the length of the dead zone is proportional to the length it takes for the dimmer to slew from 35° to 39.5°, which is less than without the application of process 400. The effect of this adjustment to the dimmer transfer function according to the example above is shown in FIGS. 5A and 5B.

Figure 5B:
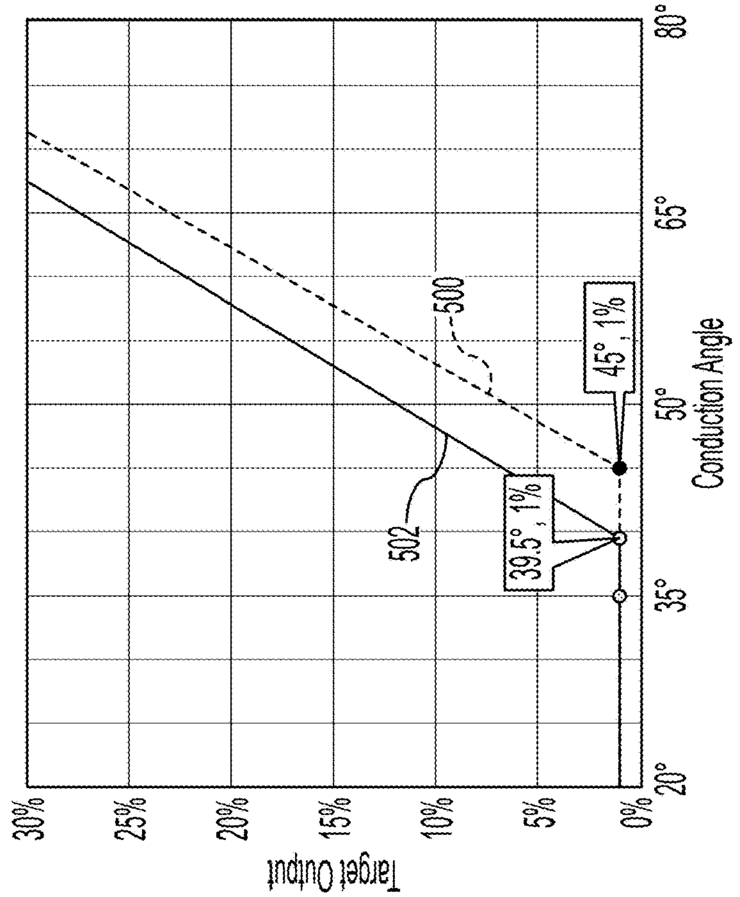
FIGS. 5A-5B illustrate a previous dimmer transfer function and an adjusted dimmer transfer function, according to some embodiments of the present disclosure.
Figure 5A:
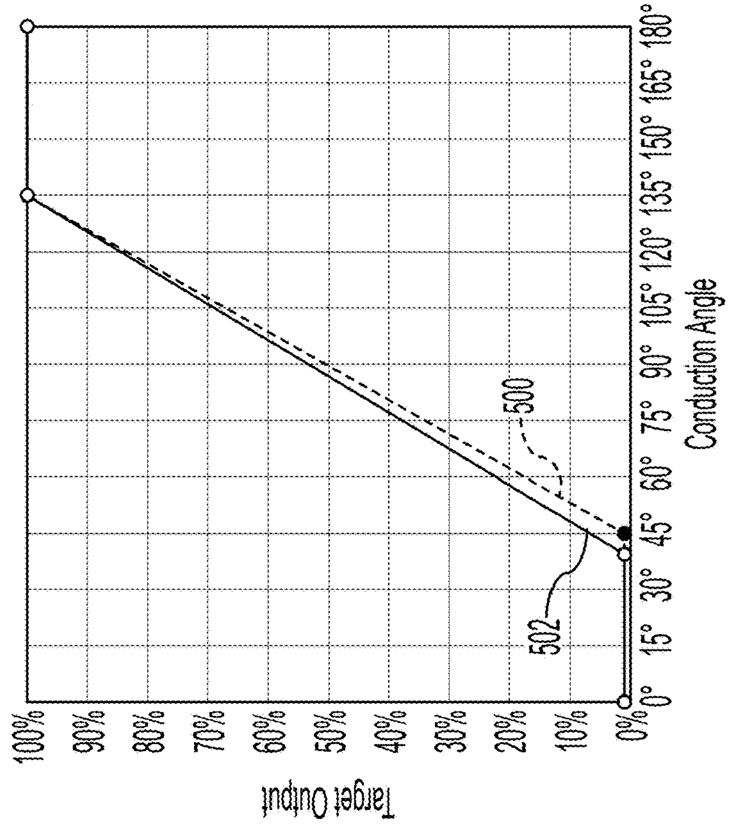

FIGS. 5A-5B illustrate a previous dimmer transfer function 500 and an adjusted dimmer transfer function 502, according to some embodiments of the present disclosure. FIG. 5B illustrates an enlarged view of a portion of the graphs 500 and 502 showing the change in the minimum set point (minSetPoint), according to some examples.

As described above, the light driver according to some embodiments with adaptive TRIAC dimming effectively addresses the challenges posed by various phase-cut dimmers. By incorporating an output correction circuit, the system dynamically adjusts the dimmer transfer function to reduce (e.g., minimize) dead zones and enhance light output stability. This capability ensures compatibility with a wide range of dimmer settings, providing a smoother transition and reducing flicker in LED lighting applications.

The system's ability to calculate and apply offsets to the dimmer transfer function allows for precise control of light output, adapting in real-time to changes in dimmer levels. This adaptability ensures efficient operation across different dimming scenarios. As a result, the light driver according to some embodiments offers a robust solution for achieving stable and consistent LED lighting performance in diverse environments.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

It will be understood that when an element or layer is referred to as being "on", "connected to", "coupled to", or "adjacent" another element or layer, it can be directly on, connected to, coupled to, or adjacent the other element or layer, or one or more intervening elements or layers may be present. When an element or layer is referred to as being "directly on," "directly connected to", "directly coupled to", or "immediately adjacent" another element or layer, there are no intervening elements or layers present.

As used herein, the terms "substantially", "about", and similar terms are used as terms of approximation and not as terms of degree, and are intended to account for the inherent variations in measured or calculated values that would be recognized by those of ordinary skill in the art.

As used herein, the terms "use", "using", and "used" may be considered synonymous with the terms "utilize", "utilizing", and "utilized", respectively.

The light driver and/or any other relevant devices or components according to embodiments of the present disclosure described herein may be implemented by utilizing any suitable hardware, firmware (e.g., an application-specific integrated circuit), software, or a suitable combination of software, firmware, and hardware. For example, the various components of the light driver may be formed on one integrated circuit (IC) chip or on separate IC chips. Further, the various components of the light driver may be implemented on a flexible printed circuit film, a tape carrier package (TCP), a printed circuit board (PCB), or formed on the same substrate. Further, the various components of the light driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present disclosure.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method of driving a light source by a light driver, the method comprising:

determining a dimming value based on an input from a phase-cut dimmer at the input of the light driver;

determining an offset for a dimmer transfer function of the light driver based on the dimming value and a minimum set point of the dimmer transfer function;

applying the offset to the dimmer transfer function of the light driver to generate an adjusted dimmer transfer function; and determining a target light output of the light source based on the dimming value and the adjusted dimmer transfer function.

2. The method of claim 1, further comprising:

driving the light source to the target light output.

3. The method of claim 1, wherein the determining the dimming value comprises:

receiving a pulse-width modulation (PWM) signal having a duty cycle corresponding to a conduction angle of the phase-cut dimmer; and generating the dimming value based on the duty cycle of the PWM signal.

4. The method of claim 1, wherein the dimmer transfer function maps dimming values to target light outputs.

5. The method of claim 1, wherein the minimum set point corresponds to a dimming level above which the light driver begins to increase light output from a lowest target output.

6. The method of claim 5, wherein the lowest target output is about 1% light output.

7. The method of claim 1, wherein the determining the offset of the dimmer transfer function comprises:

determining that the dimming value is less than a minimum threshold of the dimmer transfer function of the light driver; and determining the offset as a maximum offset.

8. The method of claim 1, wherein the determining the offset of the dimmer transfer function comprises:

determining the dimming value is greater than or equal to a minimum threshold of the dimmer transfer function of the light driver; and determining the offset based on the dimming value, the minimum set point, and a deadband value.

9. The method of claim 8, wherein the determining the offset comprises:

determining that the dimming value is greater than a difference between the minimum set point and the deadband value; and setting the offset to zero.

10. The method of claim 8, wherein the determining the offset comprises:

determining that the dimming value is less than a difference between the minimum set point and the deadband value; and calculating the offset by subtracting the dimming value from the difference between the minimum set point and the deadband value.

11. The method of claim 1, wherein the applying the offset to the dimmer transfer function of the light driver comprises:

subtracting the offset from the minimum set point of the dimmer transfer function to generate the adjusted dimmer transfer function.

12. The method of claim 1, wherein the applying the offset to the dimmer transfer function of the light driver comprises:

subtracting the offset from the minimum set point and a maximum set point of the dimmer transfer function to generate the adjusted dimmer transfer function.

13. The method of claim 12, wherein the maximum set point corresponds to a dimming level above which the light driver does not increase light output from a highest target output.

14. The method of claim 13, wherein the highest target output is about 100% light output.

15. The method of claim 1, wherein the determining the target light output of the light source comprises:

interpolating between data points of the adjusted dimmer transfer function to determine the target light output based on the dimming value.

16. A light driver comprising:

a processor; and a memory storing instructions that, when executed on the processor, cause the processor to perform:

determining a dimming value based on an input from a phase-cut dimmer at the input of the light driver;

determining an offset for a dimmer transfer function of the light driver based on the dimming value and a minimum set point of the dimmer transfer function;

applying the offset to the dimmer transfer function of the light driver to generate an adjusted dimmer transfer function; and determining a target light output of a light source coupled to the light driver based on the dimming value and the adjusted dimmer transfer function.

17. The light driver of claim 16, further comprising:

a rectifier configured to receive a phase-cut input line voltage from the phase-cut dimmer at the input of the rectifier and configured to generate a rectified input line voltage; and a pulse-width modulation (PWM) generator configured to generate a PWM signal based on the rectified input line voltage, the PWM signal having a duty cycle corresponding to a conduction angle of the phase-cut dimmer, wherein the determining the dimming value is based on the PWM signal.

18. The light driver of claim 17, further comprising:

a converter configured to convert the rectified input line voltage into a drive signal for powering the light source coupled to the light driver, wherein the drive signal is based on the target light output.

19. The light driver of claim 17, wherein the determining the offset of the dimmer transfer function comprises:

determining the dimming value is greater than or equal to a minimum threshold of the dimmer transfer function of the light driver; and determining the offset based on the dimming value, the minimum set point, and a deadband value.

20. The light driver of claim 17, wherein the applying the offset to the dimmer transfer function of the light driver comprises:

adding the offset to the minimum set point of the dimmer transfer function to generate the adjusted dimmer transfer function.

* * * * *